C. W. HAUCKE.
Seed-Droppers.

No. 155,086. Patented Sept. 15, 1874.

WITNESSES:
P. C. Dieterich
H. L. Scott

INVENTOR:
Chas. W. Haucke
per
C. H. Watson & Co
ATTORNEYS

THE GRAPHIC CO. PHOTO-LITH. 39 & 41 PARK PLACE, N.Y.

UNITED STATES PATENT OFFICE.

CHARLES W. HAUCKE, OF SPRINGFIELD, OHIO.

IMPROVEMENT IN SEED-DROPPERS.

Specification forming part of Letters Patent No. 155,086, dated September 15, 1874; application filed August 1, 1874.

*To all whom it may concern:*

Be it known that I, CHARLES W. HAUCKE, of Springfield, in the county of Clarke and State of Ohio, have invented certain new and useful Improvements in Seed-Droppers; and I do hereby declare that the following is a full, clear, and exact description thereof, which will enable others skilled in the art to which it pertains to make and use the same, reference being had to the accompanying drawings and to the letters of reference marked thereon, which form a part of this specification.

The nature of my invention consists in the construction and arrangement of a seed-dropper, as will be hereinafter more fully set forth.

Figure 1:
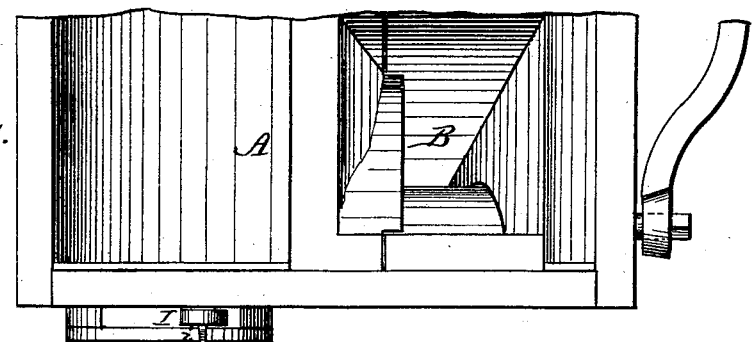
Figure 2:
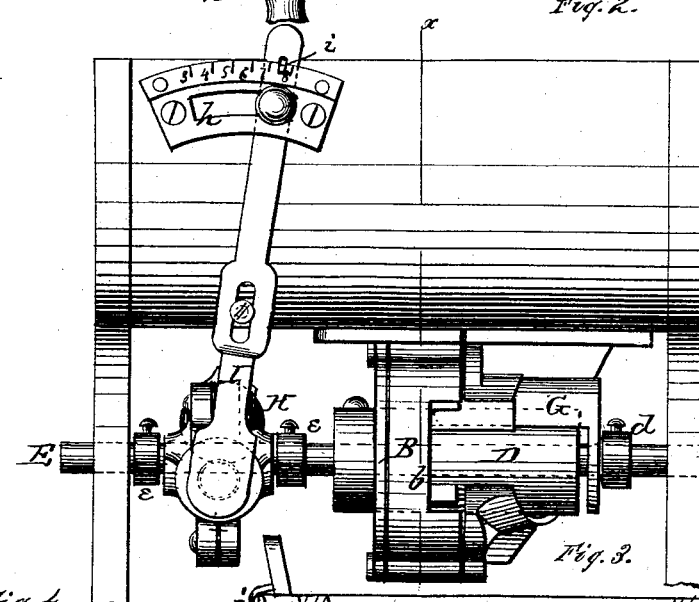
Figures 4, 5:
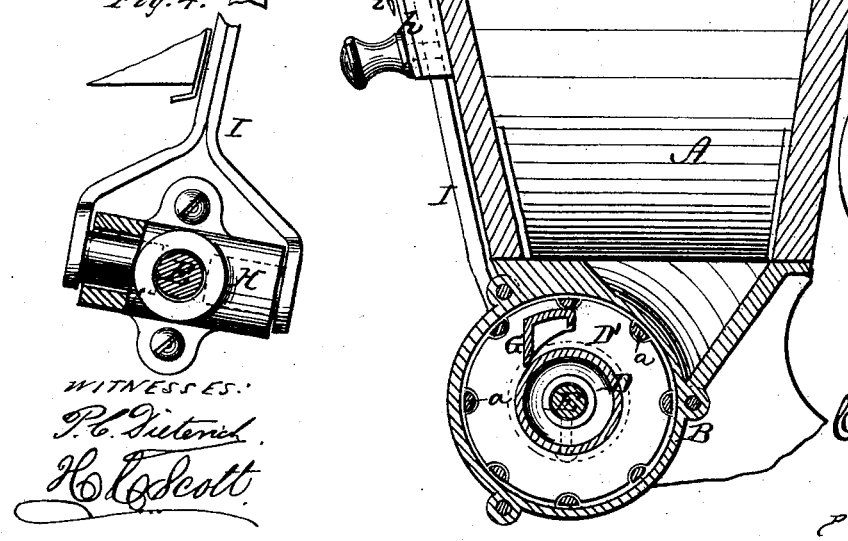

In the accompanying drawing, Figure 1 is a plan view of my seed-dropper. Fig. 2 is a side elevation of the same. Fig. 3 is a transverse section through the line $xx$, Fig. 2; and Figs. 4 and 5 are detached views of certain parts thereof.

A represents the seed-box, having the seed-cup B attached under its bottom. This cup is constructed in any of the known and usual ways; and within said cup is the feeder, consisting of an annular plate or ring, C, from which project pins or arms $a\ a$. These pins may be of any desired shape, and riveted or otherwise secured to the plate; or the plate and pins may be cast in one piece, if desired.

When the machine is in operation, the feeder C $a$ revolves, and the pins carry the grain around to the opening $b$ in the cup.

The feeder is placed on a cylinder, D, attached to a shaft, E, which runs under and parallel with the bottom of the seed-box A. The cylinder D is formed or provided with a disk, D', having grooves in its circumference for the passage of the pins $a$ of the feeder, as shown in Fig. 3, the pins coming even with the circumference of the disk. The cylinder and disk form a shifter, to be moved endwise, for regulating the amount of seed sown by lengthening or shortening the pins $a\ a$, and thus increasing or diminishing the amount of grain carried around by said pins. G represents a slide, to keep the grain from falling through the top of the cup, said slide being made to move out by the shifter D D', and to move in by means of a collar, $d$, fastened on the shaft E, outside of the slide, as shown in Fig. 2. H represents a coupling or sleeve on the shaft E, which is held in place by means of the lever I and collars $e\ e$, one on each side of it. This coupling may be made in two parts, fastened together by screws; or it may be made of one piece, and slipped on the shaft. The lever I is pivoted to the side of the seed-box, and its lower end is forked, and the prongs provided with pins, to enter holes in the ends of the coupling; or the lever may be fastened to the coupling by screws. The upper end of the lever is provided with an index or finger, $i$, to show on a dial, $h$, the amount of seed sown.

Having thus fully described my invention, what I claim as new, and desire to secure by Letters Patent, is—

1. The combination of the feeder C $a$, shifter D D', and slide G, all constructed substantially as and for the purposes herein set forth.

2. The combination of the cup B with opening $b$, feeder C $a$, shifter D D', shaft E, and slide G, all substantially as and for the purposes herein set forth.

3. The combination of the shaft E, coupling H, lever I, collars $e\ e$, and the shifter D D', substantially as and for the purposes herein set forth.

In testimony that I claim the foregoing as my own I affix my signature in presence of two witnesses.

CHARLES W. HAUCKE.

Witnesses:
   J. J. SMITH,
   F. LANG.